US006261341B1

(12) United States Patent
Cifuentes et al.

(10) Patent No.: US 6,261,341 B1
(45) Date of Patent: Jul. 17, 2001

(54) COPPER LEACH PROCESS AIDS

(75) Inventors: Ricardo Arancibia Cifuentes, Santiago (CL); Donald C. Roe, Jamison, PA (US); Jorge Vergara Chavez; Andres Reghezza Inzunza, both of Chuquicamata (CL)

(73) Assignees: BetzDearborn Inc., Trevose, PA (US); Corporacion Nacional del Cobre de Chile; a part interest ( * ) Notice: Subject to any disclaimer, the term of this patent is extended or adjusted under 35 U.S.C. 154(b) by 0 days.

(21) Appl. No.: 09/443,591

(22) Filed: Nov. 19, 1999

Related U.S. Application Data

(60) Provisional application No. 60/109,105, filed on Nov. 19, 1998.

(51) Int. Cl.[7] ........................................ C22B 3/20
(52) U.S. Cl. ........................................................ 75/743
(58) Field of Search ............................................ 75/743

(56) References Cited

U.S. PATENT DOCUMENTS 5,468,353 * 11/1995 Anich et al. ........................ 204/105

OTHER PUBLICATIONS

DEARCODOX, Development of a Reagent That Improves the Production, Quality and Environment in Hydrometallurgical Systems; Pincheria, Reghezza, Vergara, Arcos, Cifuentes, and Vergara; Expomin '98, IV International Conference on Clean Technologies for the Mining Industry; May, 1998; Santiago, Chile.

Development of a Reagent Which Improves The Behavior of Hydrometallurgical Systems; Pincheira, Reghezza, Vergara, Heller, Arcos, Cifuentes, and Vergara; Randol International Conference & Exhibition, Vancouver '98 May.

DEARCODOX Product Folder and Fact Sheet, BetzDearborn Inc.; May 1997.

* cited by examiner

*Primary Examiner*—Roy King
*Assistant Examiner*—Tima McGuthry-Banks
(74) *Attorney, Agent, or Firm*—Steven D. Boyd

(57) ABSTRACT

A method for inhibiting crud formation and organic in aqueous solvent and aqueous in organic solvent entrainment in the solvent extraction of copper from an aqueous sulfuric acid pregnant leach solution is disclosed. The method comprises adding an antifoam formulation stable at a solution pH of about 1 to 2 is added. A preferred antifoam formulation comprises a glycol ester and an alkyl phenol ethoxylate in a paraffinic oil solvent added to the acid solution.

29 Claims, 4 Drawing Sheets

COPPER LEACH PROCESS AIDS

This application claims benefit to U.S. provisional application 60/109,105, filed Nov. 19, 1998.

FIELD OF THE INVENTION

The present invention provides methods for improving the unit operations employed in recovery of copper from copper ores in leaching operations.

BACKGROUND OF THE INVENTION

The use of sulfuric acid (pH about 1.5) to leach copper from copper bearing ores is well known. Such leach operations are useful in recovering copper for ores which include oxides of copper. The leach operation can be carried out in heaps, dumps, vats or in situ. In such leach operations, the sulfuric acid is used to remove the copper from copper bearing ore which it contacts. The dilute copper bearing aqueous sulfuric acid solution is then subjected to a solvent extraction operation to extract and concentrate the copper. The solvent extracted copper is then stripped from the organic phase back into an aqueous phase. The chemical reaction involved in stripping is the reverse of the extraction process: $CuR_2 + H_2SO_4 \leftarrow \rightarrow Cu\ SO_4 + 2HR$. The aqueous phase is thereafter subjected to an electrowinning operation to recover the copper.

In heap leaching operations copper bearing ore from a mine may be crushed to produce an aggregate that is coarse enough to be permeable in a heap but fine enough to expose the copper metal values in the ore to the leaching solutions. After crushing, the ore is formed into heaps on impervious leach pads. A leaching solution of sulfuric acid is evenly distributed over the top of the heaps by sprinklers, wobblers or other similar equipment. As the barren leach solution percolates through the heap, it dissolves the copper contained in the ore. The leach solution collected by the impervious leach pad at the bottom of the heap is recovered and this "pregnant solution" is subjected to copper recovery operations (solvent extraction and electrowinning). Typically an agglomeration aid is added to the crushed ore and the so treated ore is agglomerated as with a disk pelletizer or by the action of conveyor belts. The agglomeration aids minimize the adverse effects of fines (i.e., −100 mesh components) on the heap leach operation.

In vat leach operations, copper bearing ores from a mine are crushed and placed in a large vat. The vat is filled with sulfuric acid which dissolves the copper oxides contained in the ore. The vat is drained and the "pregnant solution" subject to a copper recovery operation (solvent extraction and electrowinning).

In dump leach operations, copper bearing ore mounds, typically created by "dynamiting" an ore deposit, are sprayed with a sulfuric acid leach solution. The leach solution dissolves the copper oxides. Upon recovery, the leach solution is subjected to copper recovery operations (solvent extraction and electrowinning).

In in situ leach operations, underground copper bearing substraits are flooded with sulfuric acid leach solution. The leach solution is recovered and subjected to copper recovery operations (solvent extraction and electrowinning).

SUMMARY OF THE INVENTION

The present inventors discovered that the addition of a composition comprising an antifoam formulation such as a polyethylene glycol monooleate and an alkyl phenol ethoxylate in an oil solvent, to the sulfuric acid lixivant in copper leach operations significantly enhance such leach operation.

DESCRIPTION OF THE PREFERRED EMBODIMENTS

Figure 1:
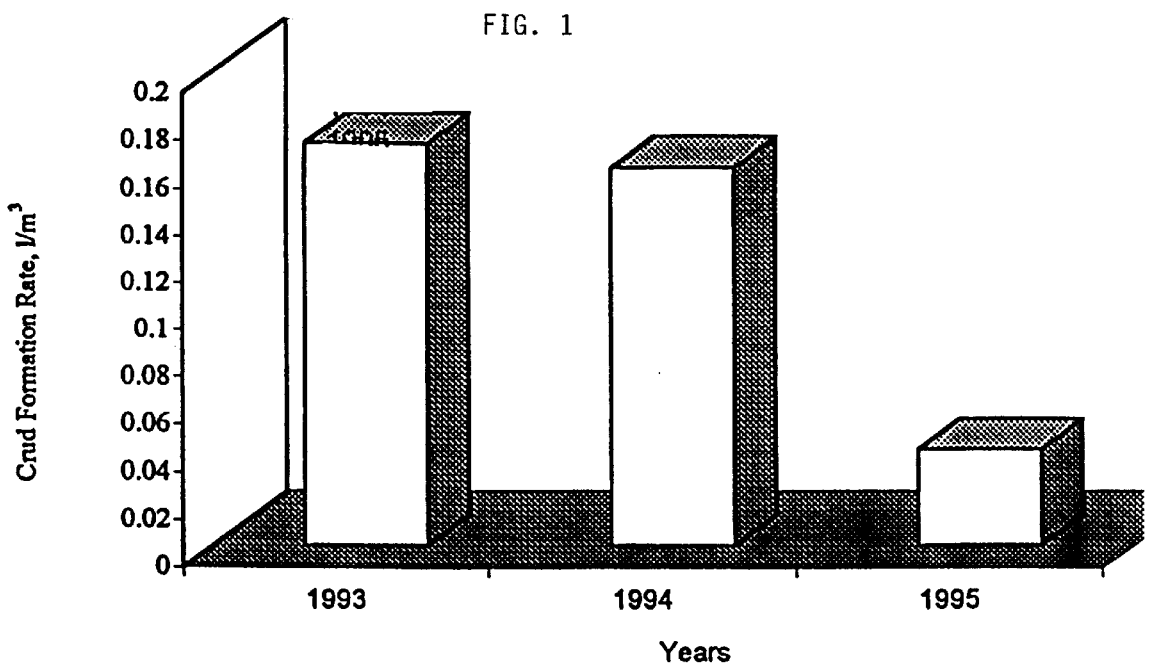
FIG. 1 is a bar graph of crud formation in liters per cubic meter for 1993, 1994 and 1995.

The present invention relates to a method of enhancing the solvent extraction operation in copper leach mining operations. In such solvent extraction operations a pregnant, or copper rich, aqueous sulfuric acid leach solution from a heap, vat, dump or in situ leach mining operation is subjected to a solvent extraction operation. The solvent extraction operation provides for transfer of the dilute copper values from the pregnant aqueous leach solution to an organic phase and then back to a concentrated aqueous phase. This "concentration" effect decreases the volume of solution which must be processed to recover the copper values.

The present inventors have discovered that the addition of a leach solution treatment to the pregnant leach solution prior to solvent extraction significantly enhances the solvent extraction process. The leach solution treatment comprises an antifoam formulation such as a polyethylene glycol monooleate and an alkyl phenol ethoxylate in an oil solvent. Optionally, an alcohol can be employed in the composition.

Antifoam formulations in accordance with the present invention are those antifoam compositions stable in acid solutions (pH=1–2) such as sulfuric acid or antifoam compositions which decompose in acidic solutions to provide decomposition products which exhibit antifoam properties.

Suitable antifoam chemistries may include, but are not limited to: fatty amides such as ethylene bis-stearamide; fatty esters or glycol esters such as polyethylene glycol ditallate; polyglycols such as ethoxylated/propoxylated alcohol; silicas such as fumed silica hydrophobed with silicone; silicones such as polydimethyl siloxane; wax dispersions such as paraffin wax emulsions; fatty acids such as stearic acid; fatty alcohols such as octadecanol; ethoxylated alkylphenols such as nonyl phenol ethoxylate; ethylene oxide/propylene oxide block copolymers or mixtures thereof.

The suitable antifoam formulation in accordance with the present invention can be formulated as: oil-based, that is the active antifoam dissolved in oil (paraffinic, naphthenic, aromatic, mineral or vegetable oil); water-based, that is the active anti-foam dissolved or emulsified in water; water-extended, that is oil-based antifoam emulsified in water (oil-in-water emulsions); concentrates, that is 100% active antifoam.

The preferred antifoam formulation treatment solution of the present invention comprises one or more low HLB (HLB less than about 10) surfactants in an oil-based solvent. The most preferred solution treatment comprises a glycol ester and an alkyl phenol ethoxylate in an oil solvent. Optionally, an alcohol can be employed in the composition.

The glycol esters are conventionally produced by polymerizing propylene oxide in the presence of an alkaline catalyst. Preferably, the glycol ester is polyethylene glycol monooleate having a molecular weight of about 400 to about 2000, or polyethylene glycol monotallate having a molecular weight of about 200 to about 2000. The preferred glycol esters are polyethylene glycol monooleate, but could be tallate, stearate, laurate and the like, most preferably with a molecular weight of about 400. A representative compound is commercially available from Lonza as PEG 400 MOT.

The alkylphenol ethoxylate compounds generally have the formula:

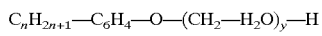

where y=1 to 12 and n=1 to 12

The glycol ester and alkyl phenol ethoxylate are added to the acidic solution in amounts to provide from about 5 to about 100 parts per million treatment formulation per ton of ore processed in a weight ratio of from about 5:95 to 95:5.

Of the compounds, nonylphenol ethoxylates are preferred with nonylphenol with about six moles ethoxylation most preferred. This compound is commercially available as Triton® N-60 from Rohm & Haas or Tergitol® NP-6 from Union Carbide.

The oil solvent can comprise a paraffinic oil solvent, an aromatic oil solvent or a naphthenic oil solvent. The paraffinic oil solvent is generally selected from those hydrotreated petroleum distillates having 10 to 18 carbon atoms such as mineral oil. Representative solvents are commercially available as Varsol® (believed to be an isoparaffinic petroleum distillate) or Exxsol® D-40 (believed to be a light hydrogenated petroleum distillate) from EXXON Chemicals.

The leach solution treatment of the present invention can be added directly to the pregnant leach solution recovered from the leaching operation. When the leach solution treatment is present in the leach solution during solvent extraction, it was discovered that there was improved overall phase separation. In addition, the formation of "crud" in this phase separation process was reduced. "Crud" is a foam-like material which often forms in this phase separation process. The leach solution treatment improves both the rate at which the phases separate as well as the absolute mass transfer of copper values from the dilute aqueous sulfuric acid phase to the organic phase and back to the concentrated aqueous phase.

The present invention will now be further described with reference to a number of specific examples which are to be regarded as illustrative and not as restricting the scope of the present invention.

EXAMPLE 1

Testing was in a copper recovery solvent extraction operation. Over a period of approximately one year, a treatment comprising a polyethylene glycol monooleate of molecular weight of about 400 and a nonylphenol with 6 moles of ethoxylation in a paraffin oil solvent in concentrations of 10 ppm and 20 ppm was added to the aqueous sulfuric acid pregnant leaching solution. As a result, the formation of crud decreased significantly. See FIG. 1 which shows crud levels in liter per cubic meter for 1993, 1994 and 1995. The treatment of this example began in December of 1994.

Figure 2:
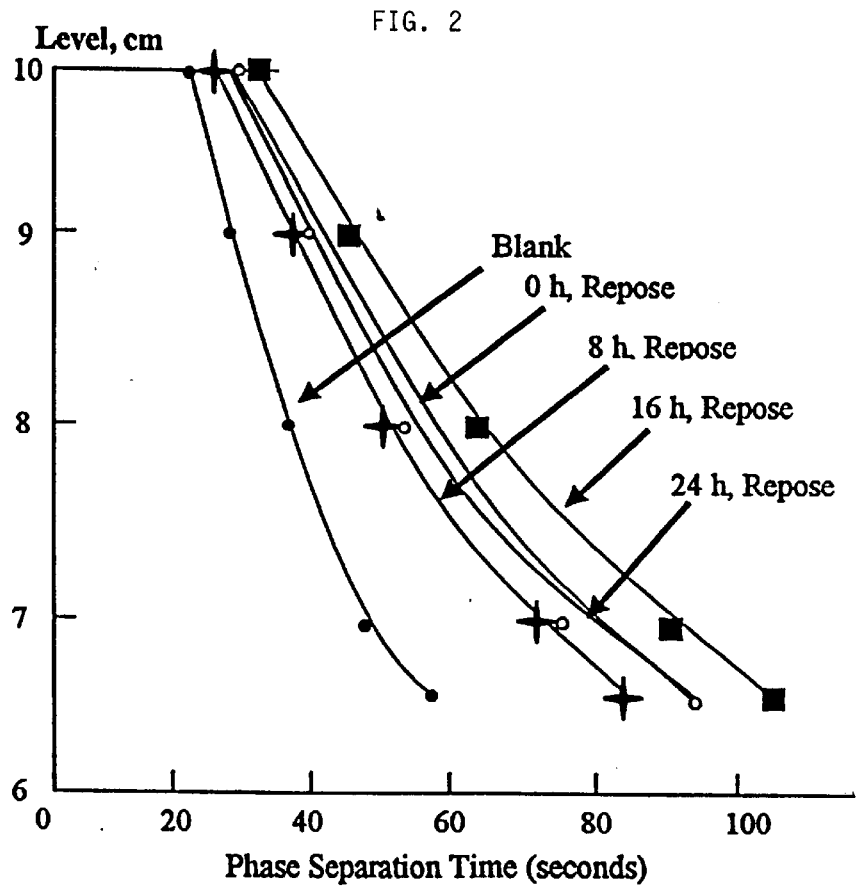
FIG. 2 is a plot of level (cm) vs. phase separation time (seconds) for the aqueous continuity extraction phase at a treatment of 10 ppm.
Figure 3:
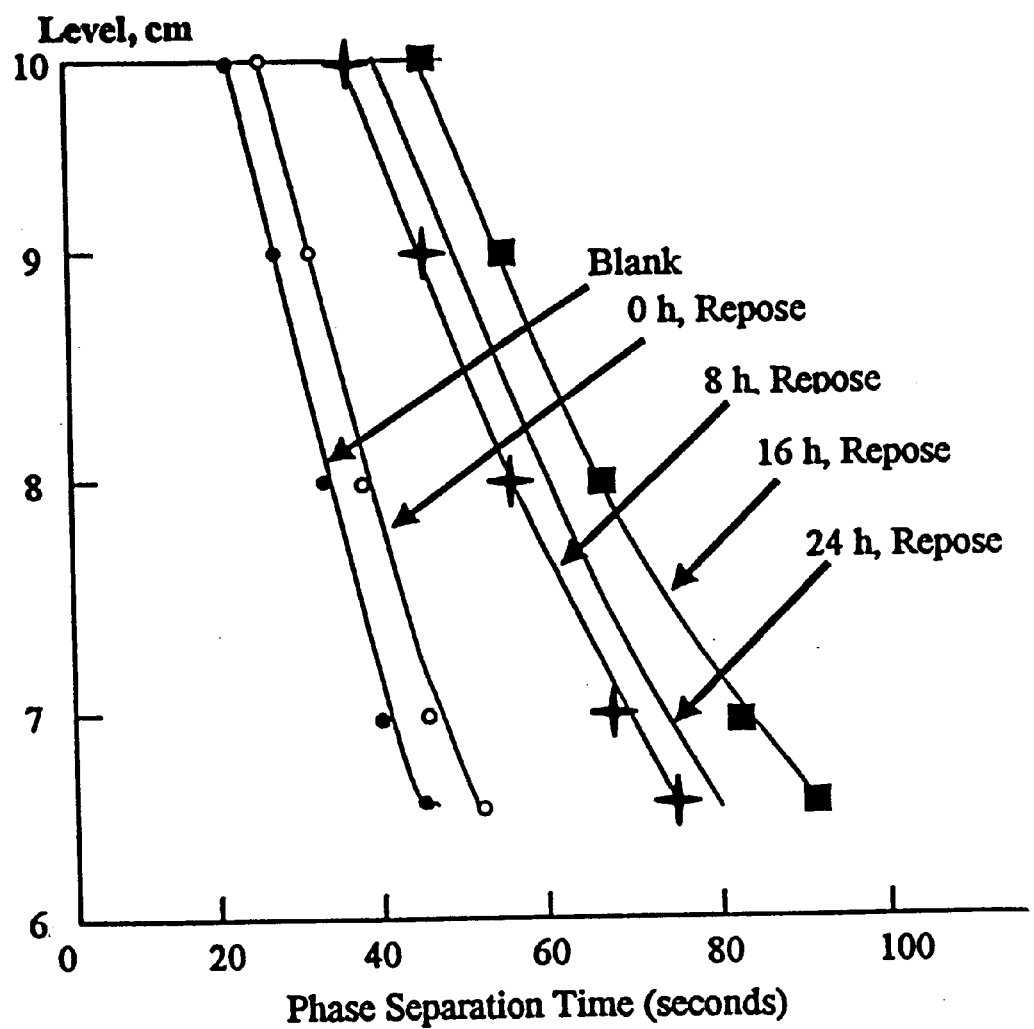
FIG. 3 is a plot of level (cm) vs. phase separation time (seconds) for the organic continuity extraction phase at a treatment of 10 ppm.

In addition, the separation of phases in the solvent extraction process was found to improve. FIG. 2 shows a plot of aqueous continuity extraction phase level vs. phase separation time for a 10 ppm treatment level. FIG. 3 shows a plot of organic continuity extraction phase level vs. phase separation time for a 10 ppm treatment level. The shift up and to the right in both figures indicates a faster phase separation response time.

Figure 4:
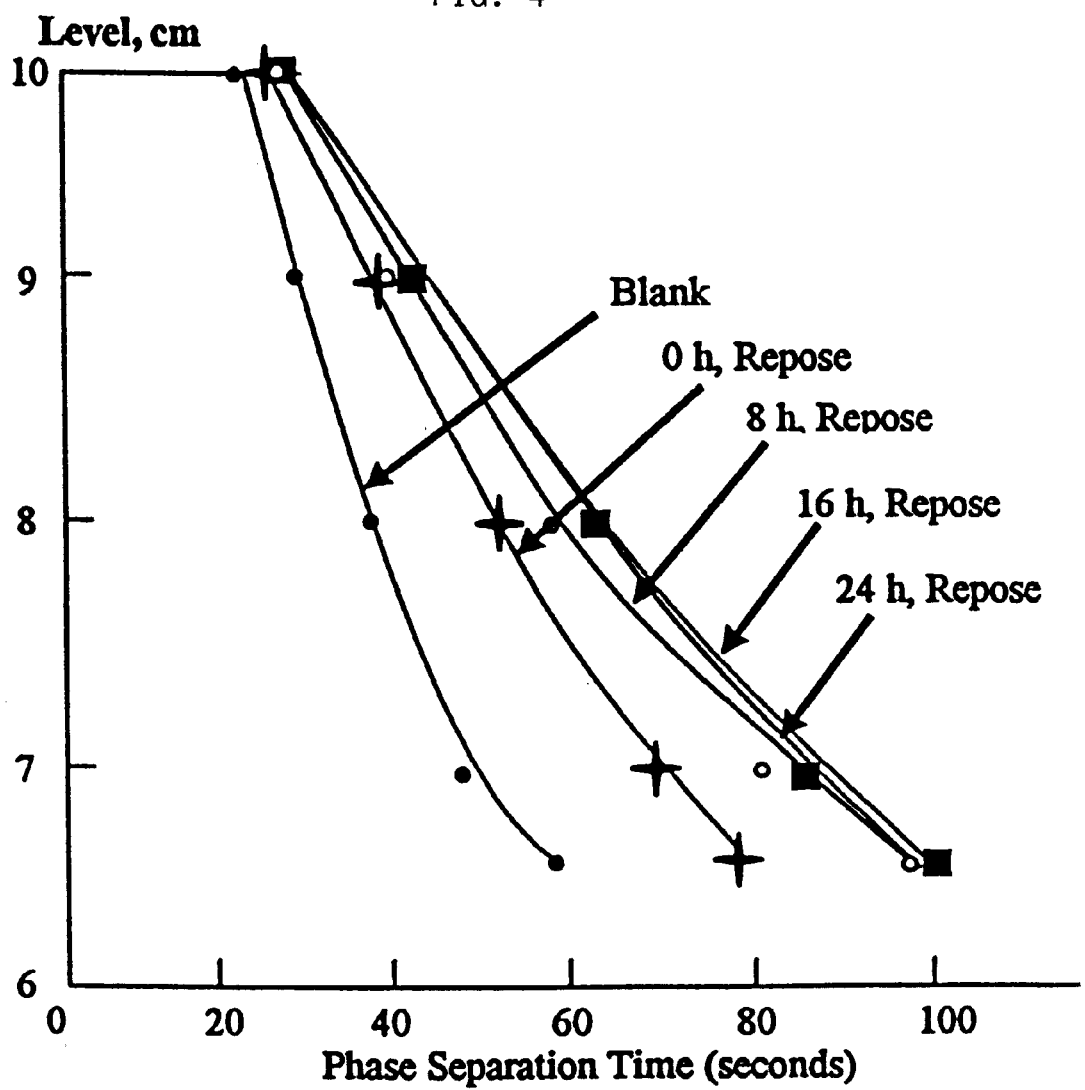
FIG. 4 is a plot of level (cm) vs. phase separation time (seconds) for the aqueous continuity extraction phase at a treatment of 20 ppm.
Figure 5:
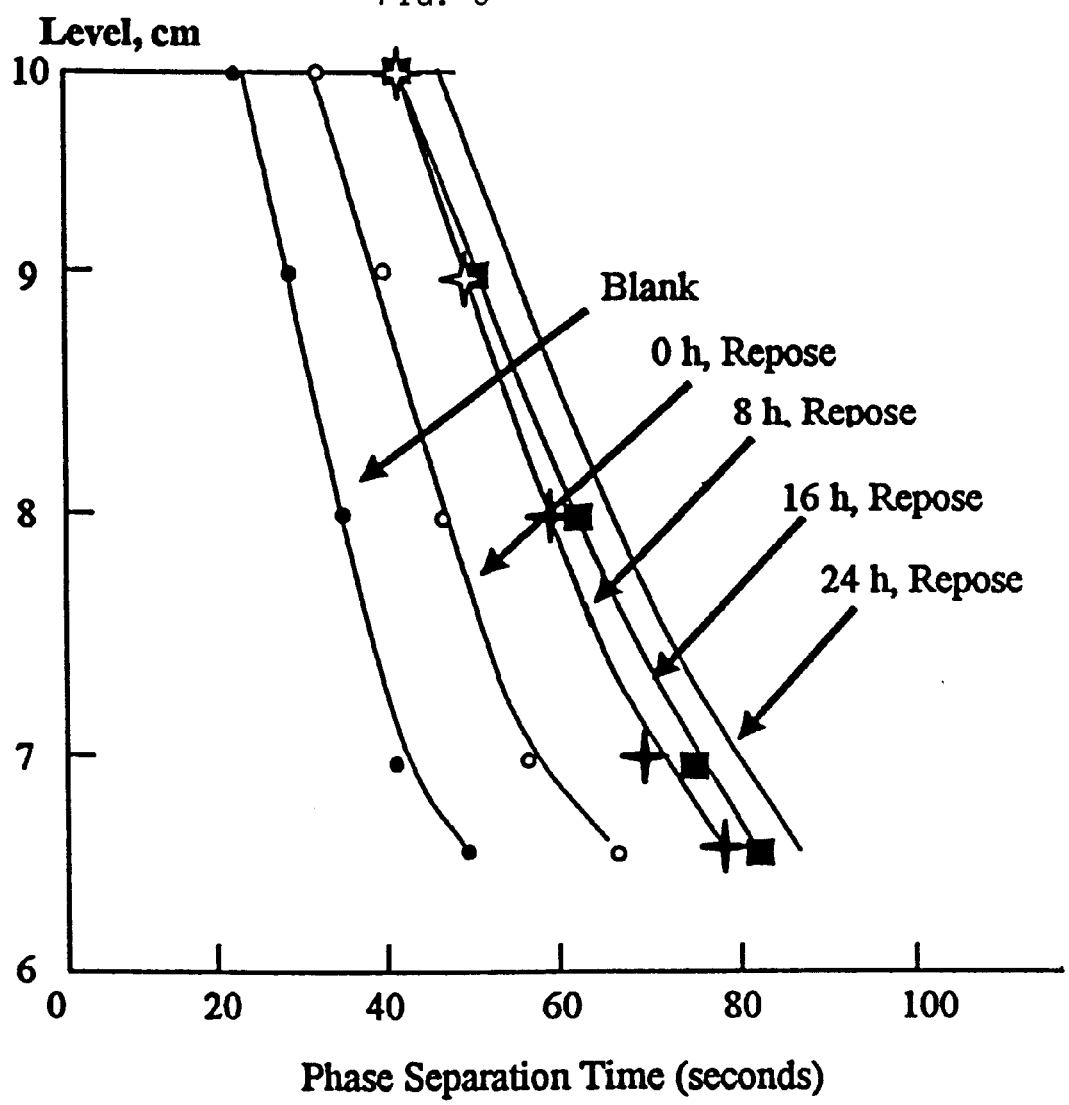
FIG. 5 is a plot of level (cm) vs. phase separation time (seconds) for the organic continuity phase at a treatment of 20 ppm.

FIGS. 4 and 5 are similar plots for a 20 ppm treatment which indicate a similar improvement.

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of increasing the rate of phase separation in a copper recovery solvent extraction process in which copper is recovered from an aqueous sulfuric acid pregnant leach solution which comprises adding to said pregnant leach solution an antifoam formulation which exhibits antifoam properties at a solution pH of about pH 1 to 2 selected from the group consisting of fatty amides, glycol esters, fatty esters, polyglycols, silicas, silicons, wax dispersions, fatty acids, fatty alcohols, ethoxylated alkyl phenols, ethylene oxide/propylene oxide block copolymers, and mixtures thereof in an amount sufficient to increase the rate of phase separation in a copper recovery solvent extraction process.

2. The method of claim 1 wherein said antifoam formulation is dissolved in an oil selected from the group consisting of paraffinic oil, naphthenic oil, aromatic oil, mineral oil, vegetable oil or mixtures thereof.

3. The method of claim 2 wherein said antifoam comprises an oil-in-water emulsion.

4. The method of claim 1 wherein said antifoam formulation is dissolved in water.

5. A method of inhibiting the formation of crud in a solvent extraction of copper from an aqueous sulfuric acid, pregnant copper leach solution comprising adding a glycol ester and an alkyl phenol ethoxylate in an oil solvent to said pregnant leach solution in an amount sufficient to inhibit crud formation.

6. The method of claim 5 further comprising adding an alcohol to said acid solution.

7. The method of claim 5 wherein said alkyl phenol ethoxylate has the general formula

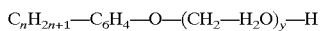

where y=1 to 12 and n=1 to 12.

8. The method of claim 7 wherein said alkyl phenol ethoxylate is nonyl phenol ethoxylate.

9. The method of claim 8 wherein said nonyl phenol ethoxylate has about six moles of ethoxylation.

10. The method of claim 5 wherein said glycol ester is selected from the group consisting of polyethylene glycol monooleate and polypropylene glycol monooleate.

11. The method of claim 10 wherein said polypropylene glycol monooleate has a molecular weight of from about 400 to about 2000.

12. The method of claim 10 wherein said polyethylene glycol monooleate has a molecular weight of from about 200 to 2000.

13. The method of claim 5 wherein said glycol ester and alkyl phenol ethoxylate are added to said acid solution in an amount from about 5 to about 100 parts per million per ton of ore processed in a weight ratio of from about 5:95 to 95:5.

14. The method of claim 5 wherein said oil solvent is a paraffinic oil solvent.

15. The method of claim 5 wherein said oil solvent is a naphthenic oil solvent.

16. The method of claim 5 wherein said oil solvent is an aromatic oil solvent.

17. A method of inhibiting the entrainment of aqueous solvent in organic solvent and the entrainment of organic solvent in aqueous solvent in the solvent extraction of copper from an aqueous sulfuric acid, pregnant leach solution comprising adding a glycol ester and an alkyl phenol ethoxylate in an oil solvent to said pregnant leach solution in an amount sufficient to inhibit the entrainment of aqueous solvent in organic solvent and the entrainment of organic solvent in aqueous solvent.

18. The method of claim 17 further comprising adding an alcohol to said acid solution.

19. The method of claim 17 wherein said alkyl phenol ethoxylate has the general formula $$C_nH_{2n+1}-C_6H_4-O-(CH_2-H_2O)_y-H$$

where y=1 to 12 and n=1 to 12.

20. The method of claim 19 wherein said alkyl phenol ethoxylate is nonylphenol ethoxylate.

21. The method of claim 20 wherein said nonyl phenol ethoxylate has about six moles of ethoxylation.

22. The method of claim 17 wherein said glycol ester is a polypropylene glycol monooleate.

23. The method of claim 17 wherein said glycol ester is an polyethylene glycol monooleate.

24. The method of claim 22 wherein said polypropylene glycol monooleate has a molecular weight of from about 400 to about 2000.

25. The method of claim 23 wherein said polyethylene glycol monooleate has a molecular weight of from about 200 to about 2000.

26. The method of claim 17 wherein said glycol ester and alkyl phenol ethoxylate are added to said acid solution in an amount from about 5 to about 100 parts per million per ton of ore processed in a weight ratio of from about 5:95 to 95:5.

27. The method of claim 17 wherein said oil solvent is a paraffinic oil solvent.

28. The method of claim 17 wherein said oil solvent is a naphthenic oil solvent.

29. The method of claim 17 wherein said oil solvent is an aromatic oil solvent.

* * * * *